(12) United States Patent
Holmes et al.

(10) Patent No.: US 10,377,221 B2
(45) Date of Patent: Aug. 13, 2019

(54) POWERTRAIN INCLUDING MODULAR DRIVE UNIT

(71) Applicant: GM GLOBAL TECHNOLOGY OPERATIONS LLC, Detroit, MI (US)

(72) Inventors: Alan G. Holmes, Clarkston, MI (US); Joseph Ralph Littlefield, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 706 days.

(21) Appl. No.: 14/939,548

(22) Filed: Nov. 12, 2015

(65) Prior Publication Data

US 2017/0136867 A1     May 18, 2017

(51) Int. Cl.
| | |
|---|---|
| *B60K 6/365* | (2007.10) |
| *B60K 1/00* | (2006.01) |
| *B60K 6/40* | (2007.10) |
| *B60K 6/445* | (2007.10) |
| *B60K 6/52* | (2007.10) |

(Continued)

(52) U.S. Cl.
CPC ............... *B60K 6/365* (2013.01); *B60K 1/00* (2013.01); *B60K 6/40* (2013.01); *B60K 6/445* (2013.01); *B60K 6/52* (2013.01); *B60K 6/547* (2013.01); *B60K 17/08* (2013.01); *B60K 17/356* (2013.01); *F16H 3/725* (2013.01); *B60K 2001/001* (2013.01); *B60Y 2200/91* (2013.01); *B60Y 2200/92* (2013.01); *B60Y 2400/73* (2013.01); *F16H 2200/2005* (2013.01); *F16H 2200/2007* (2013.01); *F16H 2200/2035* (2013.01); *Y10S 903/911* (2013.01); *Y10S 903/916* (2013.01);

(Continued)

(58) Field of Classification Search
CPC ....... F16H 3/725; B60K 17/356; B60K 6/365; B60K 6/445; B60K 2001/001
See application file for complete search history.

(56) References Cited

U.S. PATENT DOCUMENTS 6,155,364 A * 12/2000 Nagano .................. B60K 6/365
                                                    180/65.235
7,220,203 B2 * 5/2007 Holmes .................. B60K 6/365
                                                    475/5

(Continued)

FOREIGN PATENT DOCUMENTS

| CN | 102806837 A | 12/2012 |
|---|---|---|
| CN | 103009995 A | 4/2013 |

(Continued)

*Primary Examiner* — Erin D Bishop
(74) *Attorney, Agent, or Firm* — Quinn IP Law

(57) ABSTRACT

A powertrain includes a drive unit that can be modular and is adaptable to be used as an all-electric drive unit, an input power-split drive unit, or an input and compound power-split drive unit. The drive unit includes a first planetary gear set that has a sun gear member, a ring gear member, and a carrier member all rotatable about a first axis of rotation. The drive unit includes a first electric machine operable as a motor and having a rotor connected to rotate in unison with the sun gear member about the first axis of rotation. A first brake is selectively engageable to ground the ring gear member, a first clutch is operatively connected to the ring gear member, and an output member is connected to rotate in unison with the carrier member about the first axis of rotation. Multiple drive units can be used on a vehicle.

20 Claims, 4 Drawing Sheets

(51) Int. Cl.
  *B60K 6/547*   (2007.10)
  *B60K 17/08*   (2006.01)
  *F16H 3/72*    (2006.01)
  *B60K 17/356*  (2006.01)

(52) U.S. Cl.
  CPC ........ *Y10S 903/919* (2013.01); *Y10S 903/951* (2013.01)

(56) References Cited

U.S. PATENT DOCUMENTS

| | | | |
|---|---|---|---|
| 8,182,391 B2 * | 5/2012 | Klemen | B60K 6/365 |
| | | | 477/5 |
| 8,738,207 B2 | 5/2014 | Holmes et al. | |
| 8,979,694 B2 | 3/2015 | Holmes et al. | |
| 9,156,348 B1 | 10/2015 | Swales et al. | |
| 9,527,382 B2 * | 12/2016 | Smetana | B60K 1/02 |
| 9,527,499 B2 | 12/2016 | Holmes | |
| 2004/0097316 A1 | 5/2004 | Misu | |
| 2011/0160015 A1 * | 6/2011 | Ren | B60K 6/442 |
| | | | 475/5 |
| 2014/0277891 A1 * | 9/2014 | Hoshiba | B60K 6/445 |
| | | | 701/22 |

FOREIGN PATENT DOCUMENTS

| | | | |
|---|---|---|---|
| JP | 2010076679 A | 4/2010 | |
| JP | 2011143754 A | 7/2011 | |
| WO | WO-2013178458 A1 * | 12/2013 | ............... B60K 1/02 |

\* cited by examiner

POWERTRAIN INCLUDING MODULAR DRIVE UNIT

TECHNICAL FIELD

The present teachings generally include a powertrain with a drive unit.

BACKGROUND

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY

A powertrain includes a drive unit that is adaptable to be used as an all-electric drive unit, an input power-split drive unit, or an input and compound power-split drive unit. Additionally, a first drive unit with one configuration can be adapted to drive one axle of a vehicle, while a second drive unit with the same or a different configuration can be adapted to drive a second axle of the vehicle. The drive unit can be configured as a module enabling the common components of the module to be used alone (as an all-electric drive unit) or with other components as an input power-split, or an input and compound power-split drive unit. Moreover, multiple modular drive units can be used on a vehicle to drive different axles in various all-wheel drive configurations.

The drive unit includes a first planetary gear set that is a simple planetary gear set having a sun gear member, a ring gear member, and a carrier member that supports a plurality of pinion gears that mesh with both the ring gear member and the sun gear member. The sun gear member, the ring gear member, and the carrier member are rotatable about a first axis of rotation. The drive unit also includes a first electric machine operable as a motor and having a rotor connected to rotate in unison with the sun gear member about the first axis of rotation. A first brake is selectively engageable to ground the ring gear member, a first clutch is operatively connected to the ring gear member, and an output member is connected to rotate in unison with the carrier member about the first axis of rotation.

In one embodiment, the drive unit is an all-electric drive unit for an all-electric driven axle. The first brake is selectively engageable to establish a reduction gear ratio through the first planetary gear set from the electric machine to the output member. The first clutch is selectively engageable to connect the ring gear member for rotation in unison with one of the carrier member and the sun gear member. Both the first brake and the first clutch are engaged to hold the first planetary gear set stationary in a park mode.

In another embodiment, the drive unit is adapted to be used in an input power-split arrangement by operatively connecting an engine having a crankshaft rotatable about the first axis of rotation to drive the ring gear member. The first brake is engaged and the first clutch is disengaged to establish an electric operating mode in which only the electric machine drives the output member. Both the first brake and the first clutch are disengaged to establish an input power-split operating mode in which the engine drives the ring gear member and the electric machine is controlled to act as a motor or a generator. The first clutch is engaged and the first brake is disengaged in a parallel hybrid operating mode in which the engine drives the ring gear member and the electric machine is controlled to act as a motor or a generator. Both the first brake and the first clutch are engaged to hold the first planetary gear set stationary in a park mode.

In still another embodiment, the drive unit is adapted to be used in an input and compound power-split arrangement by including a second planetary gear set that is a simple planetary gear set having a sun gear member, a ring gear member, and a carrier member that supports a plurality of pinion gears that mesh with both the ring gear member and the sun gear member. The sun gear member of the second planetary gear set, the ring gear member of the second planetary gear set, and the carrier member of the second planetary gear set are rotatable about the first axis of rotation. A second electric machine operable as a motor is also included and has a rotor connected to rotate in unison with the sun gear member of the second planetary gear set about the first axis of rotation. An interconnecting member continuously connects the carrier member of the first planetary gear set for rotation in unison with the carrier member of the second planetary gear set. An engine having a crankshaft is operatively connected to drive the ring gear member of the second planetary gear set. A second brake is selectively engageable to ground the ring gear member of the second planetary gear set. The first clutch is selectively engageable to connect the ring gear member of the first planetary gear set for rotation in unison with the sun gear member of the second planetary gear set.

Multiple ones of the modular drive units can be used to drive different axles of a vehicle such as to provide all-wheel drive. For example, a first differential may be configured to be driven by the output member of a first one of the drive units and is rotatable about a second axis of rotation parallel with and spaced apart from the first axis of rotation. A second drive unit may be configured as a second module substantially identical to the first module. The second module may include a planetary gear set, an electric machine, a brake, a clutch, and an output member substantially identical to the first planetary gear set, the first electric machine, the first brake, the first clutch, and the output member of the first drive unit respectively, and concentric about a third axis of rotation parallel with and spaced from the first and second axes of rotation. A second differential may be configured to be driven by the output member of the second drive unit and rotatable about a fourth axis of rotation parallel with and spaced apart from the third axis of rotation. In one embodiment, both the first drive unit and the second drive unit are configured as electric-only drive units. For example, such a vehicle may be an all-wheel drive battery electric vehicle or an all-wheel drive fuel cell electric vehicle. In another embodiment, the first drive unit is an input power-split drive unit and the second drive unit is an all-electric drive unit. For example, such a vehicle may be a hybrid vehicle such as a plug-in hybrid electric vehicle or an extended-range electric vehicle.

The above features and advantages and other features and advantages of the present teachings are readily apparent

DETAILED DESCRIPTION

Figure 1:
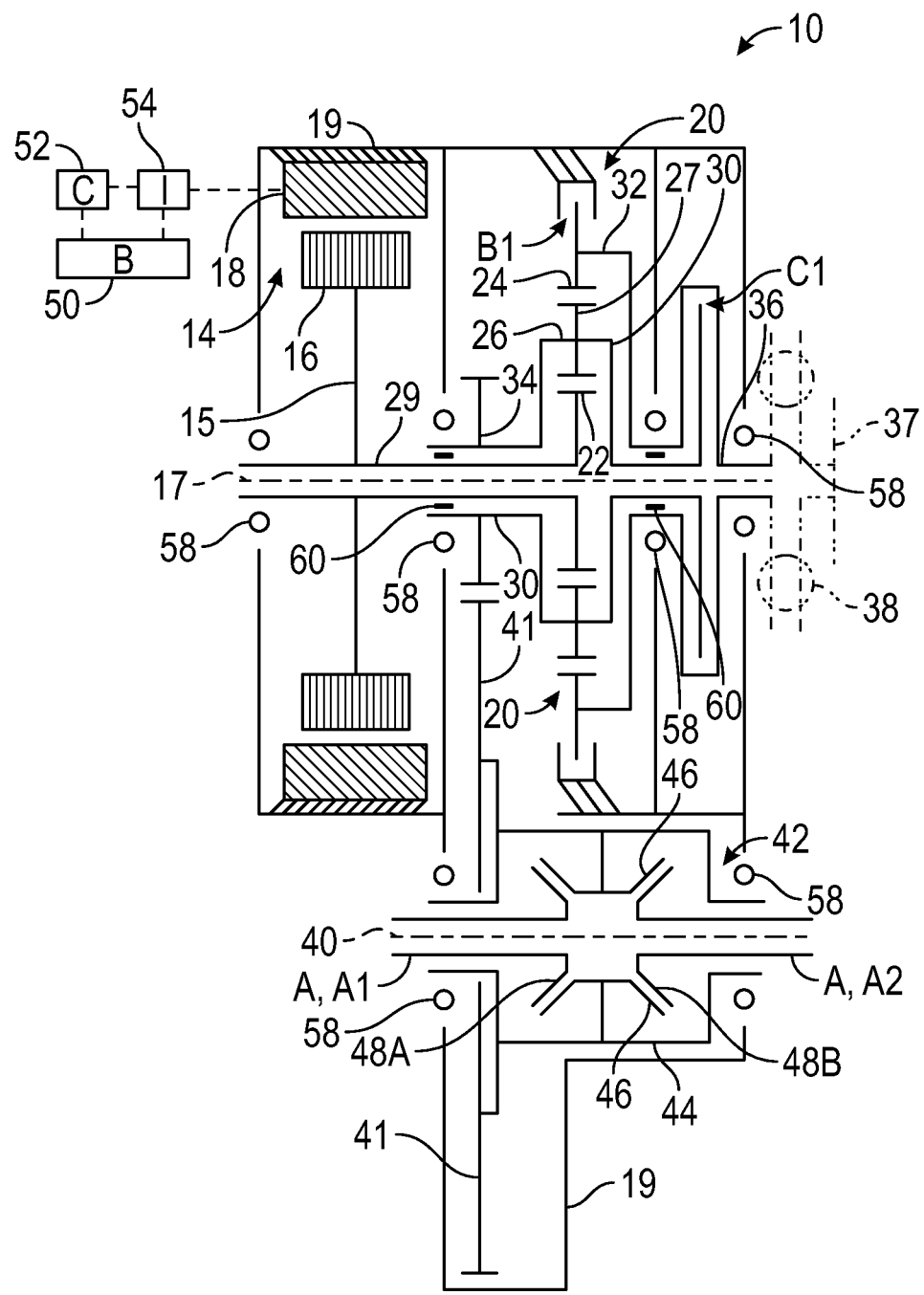
FIG. 1 is a schematic illustration of a first embodiment of a powertrain.

Referring to the drawings, wherein like reference numbers refer to like components throughout the views, FIG. 1 shows a powertrain 10 such as for a vehicle. The powertrain 10 includes a drive unit 12. As discussed herein, the drive unit 12 is a module configured with common components adaptable to be used as an all-electric drive unit, an input power-split drive unit, or an input and compound power-split drive unit. Additionally, a first drive unit with one configuration can be adapted to drive one axle of a vehicle, while a second drive unit with the same or a different configuration can be adapted to drive a second axle of the vehicle.

In FIG. 1, the drive unit 12 is configured as an all-electric drive unit, having only a single power source that is a single electric machine, referred to herein as a first electric machine 14, that is configured to operate as a motor and, in the case of a battery-charged electric machine 14, optionally also as a generator. A rotor hub 15 supports a rotor 16 of the electric machine 14 so that the rotor 16 is rotatable about a first axis of rotation 17. A stator 18 of the electric machine 14 is held stationary (i.e., non-rotatable) on a stationary member 19. For example, the stationary member 19 may be a module housing 19 inside of which the components of the drive unit 12 are packaged such that they are each concentric about the first axis of rotation 17. The module housing 19 may have multiple housing portions.

The all-electric drive unit 12 includes a single planetary gear set, referred to herein as a first planetary gear set 20. The first planetary gear set 20 is a simple planetary gear set having a sun gear member 22, a ring gear member 24, and a carrier member 26 that supports a plurality of pinion gears 27 that mesh with both the ring gear member 24 and the sun gear member 22. The sun gear member 22, the ring gear member 24, and the carrier member 26 are rotatable about the first axis of rotation 17. The rotor 16 is connected to rotate in unison with the sun gear member 22 about the first axis of rotation 17. More specifically, the rotor hub 15 and the sun gear member 22 are both mounted on and rotate in unison with a shaft 29 having a longitudinal axis coincident with the axis of rotation 17. The rotor 16 drives the first shaft 29 when the rotor 16 functions as a motor.

The drive unit 12 includes a first brake B1 that is selectively engageable to ground the ring gear member 24 to the stationary member 19 (referred to as the low gear state). The drive unit 12 also includes a first clutch C1 that is operatively connected to the ring gear member 24 and is selectively engageable to establish a direct drive torque ratio of the first planetary gear set 20 (referred to as the high gear state). A direct drive ratio is a 1:1 gear ratio in which the first planetary gear set 20 carries torque without torque reduction or torque multiplication. As such, the drive unit 12 is referred to as a two-speed electric drive unit. The two-speed functionality of the drive unit 12 allows the electric machine 14 to be better optimized for power and size than if only one torque ratio was available through the planetary gear set 20. In the direct drive ratio (high gear state), a lower motor speed is able to be used for highway cruising than in the low gear state.

A first hub 30 is concentric with the first shaft 29 and extends axially from the carrier member 26 to a first portion of the first clutch C1. The first hub 30 also extends axially from the carrier member 26 toward the electric machine 14, and supports an output member 34 that is mounted to rotate in unison with the first hub 30 about the axis of rotation 17. The first hub 30 is a sleeve shaft concentric with and surrounding the first shaft 29. A second hub 32 is concentric with the first hub 30 and surrounds the first hub 30 as a sleeve. The second hub 32 extends axially from and is rotatable in unison with the ring gear member 24. Because the first shaft 29 extends through the sleeve shaft 30 and the first shaft 29 does not need to be a sleeve shaft, relatively small bearings 58, 60, discussed herein, can be used to support the shaft 29, which achieves the relatively high speeds of the rotor 16. The smaller bearings reduce cost and spin losses in comparison to larger bearings.

When the first clutch C1 is engaged, the first hub 30 is connected to rotate in unison with the second hub 32 so that the ring gear member 24 and the carrier member 26 rotate in unison, causing planetary gear set 20 to be locked in a direct drive ratio. A person skilled in the art will readily understand that when any two of the sun gear member, the ring gear member, and the carrier member of a simple planetary gear set are connected to rotate in unison or to be grounded, each one of sun gear member, the carrier member, and the ring gear member is caused to rotate in unison or be grounded. Accordingly, in an alternative embodiment within the scope of the present teachings, the clutch C1 could be configured to be selectively engageable to connect the ring gear member 24 to the sun gear member 22 to equally cause a direct drive ratio through the planetary gear set 20.

In the embodiment shown, the output member 34 is positioned axially between the rotor 16 and the first planetary gear set 20, the first planetary gear set 20 is positioned axially between the output member 34 and the first clutch C1, and the first brake B1 is disposed directly radially outward of the ring gear member 24. By positioning the first clutch C1 nearest an axial end 36 of the drive unit 12 rather than positioning the planetary gear set 20 or the output member 34 at the axial end 36, the drive unit 12 is readily adaptable to be connected to and used with additional components to establish different operating modes. The axial end 36 is a shaft portion of the second hub 32. For example, FIG. 1 shows in phantom a flange 37 and a torsional vibration absorber 38 that can be provided on the axial end 36 or easily mounted thereto. Additionally, by utilizing a planetary gear set 20 instead of spur gear trains, axial and radial space requirements are minimized for a given overall desired torque ratio change. By packaging the brake B1 directly radially outward of the ring gear member 24, axial space requirements are further minimized.

The powertrain 10 includes an axle A comprising a first half shaft A1 and a second half shaft A2 rotatable about a second axis of rotation 40 that is parallel with and spaced apart from the first axis of rotation 17. A transfer gear 41 meshes with the output member 34 and is rotatable about the second axis of rotation 40.

A differential 42 is configured to be driven by the output member 34 and is drivingly connected to the half shafts A1, A2. The differential 42 includes a differential housing 44 rotatable about the second axis of rotation 40. Pinion gears 46 rotate in unison with the housing 44 and mesh with side gears 48A, 48B disposed for rotation in unison with the first and second axle portions A1, A2, respectively. The output member 34 may be referred to as a first transfer member, and the transfer gear 41 may be referred to as a second transfer member that together transfer torque from components rotatable about the first axis of rotation 17 to components rotatable about the second axis of rotation 40. Together, the transfer members 34, 41 are offset transfer gearing. The differential 42 may be packaged within a portion of the drive unit housing 19 or a separate housing mounted to the drive unit housing 19.

A controller 52, labeled C in FIG. 1, is operatively connected to the electric machine 14 and monitors the speed of the rotor 16. The controller 52 also receives information regarding other vehicle operating conditions, such as driver accelerator commands, and is operable to provide electrical energy from an energy storage device 50 through a power inverter 54, labeled I in FIG. 1, to the electric machine 14 to cause the electric machine 14 to function as a motor, adding torque to the sun gear member 22. The power inverter 54 converts direct current of the energy storage device 50 to alternating current when electrical power is provided to the electric machine 14. If the information received by the controller 52 indicates that the electric machine 14 should be operated as a generator, converting mechanical energy into electrical energy, the controller 52 is operable to cause the electric machine 14 to function as a generator, and, in the case of a battery as the energy storage device 50, to cause the power inverter 54 to convert alternating current provided from the electric machine 14 into direct current stored in the energy storage device 50. For the embodiment shown, the energy storage device 50 can be either of a battery and a fuel cell. The lines in FIG. 1 connecting the electric machine 14, the energy storage device 50, the controller 52, the inverter 54, and stator windings of the stator 18 represent transfer conductors for relaying electrical current or signals between the components. The powertrain 10 requires only eight bearings. Six of the bearings are ball bearings 58 and two of the bearings are needle bearings 60.

The powertrain 10 with the all-electric drive unit 12 has four different operating modes and provides motive power to the axle A in two of the operating modes. In a first operating mode referred to as Low Gear, the first brake B1 is engaged and the electric machine 14 is controlled to function as a motor to establish a reduction gear ratio (i.e., with torque multiplication) through the first planetary gear set 20 from the electric machine 14 to the output member 34. The first clutch C1 is not engaged.

In a second operating mode, both the first brake B1 and the first clutch C1 are disengaged. The planetary gear set 20 cannot transfer torque, and the electric machine 14 is thus not operatively connected to the axle A. The second operating mode can thus be referred to as a neutral operating mode, as the electric machine 14 can be off or can be functioning as a motor but without causing torque transfer.

In a third operating mode, the first brake B1 is disengaged and the first clutch C1 is engaged, establishing a direct drive ratio from the electric machine 14 to the output member 34. The electric machine 14 is controlled to function as a motor.

In a fourth operating mode, both the first brake B1 and the first clutch C1 are engaged. This causes the entire planetary gear set 20 to be held stationary in a park mode also referred to as a locked mode. The axle A is therefore also held stationary as neither the output member 34 nor the transfer gear 41 can rotate.

Transitions between operating modes can be synchronized through the disengaged state if interrupting power is tolerated. Alternatively, these transitions can be power-shifted (i.e., engagements made without synchronization) if the first clutch C1 is configured to slip in a controlled manner, and the first brake B1 can also slip in a controlled manner or is a selectable one-way braking clutch.

Figure 2:
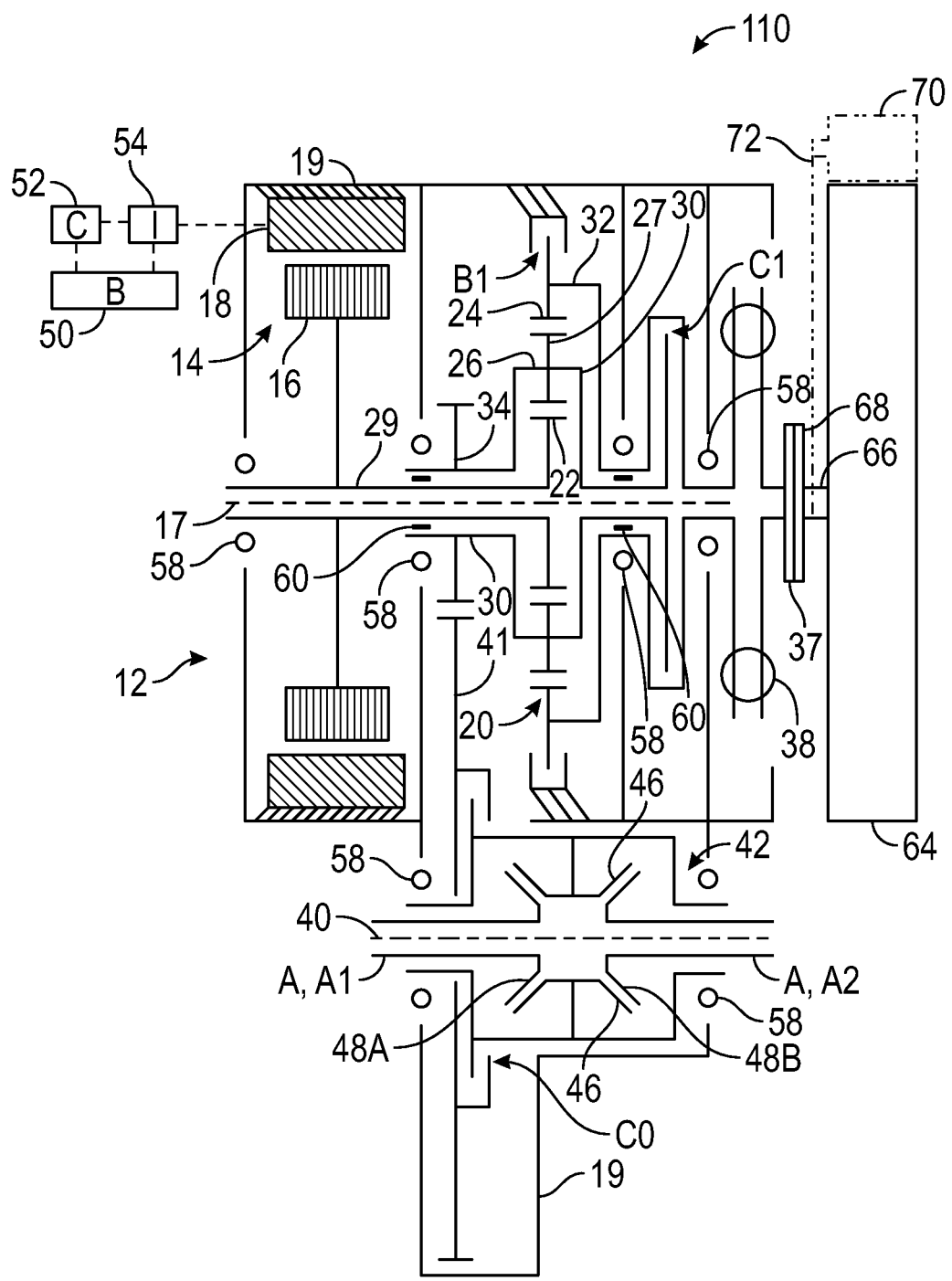
FIG. 2 is a schematic illustration of a second embodiment of a powertrain in accordance with an alternative aspect of the present teachings.

FIG. 2 shows an embodiment of a powertrain 110 that includes the same drive unit 12 as shown and described with respect to FIG. 1, with the addition of (i) an engine 64 having a crankshaft 66 rotatable about the first axis of rotation 17 and operatively connected to drive the ring gear member 24, and, optionally, an additional clutch C0 selectively engageable to connect the transfer gear 41 to rotate in unison with the differential housing 44. The crankshaft 66 can be operatively connected to rotate with the ring gear member 24 via a flange 68 mounted on the crankshaft 66 and fixable to the flange 37 such as but not limited to with bolts. The powertrain 110 may also optionally include a starter motor 70, shown in phantom, that is operatively connected to the crankshaft 66 via a drivetrain 72 that may be a belt and pulleys, a gear train, a chain and sprockets, or otherwise.

Because the powertrain 110 has two different power sources, the electric machine 14 and the engine 64 arranged as discussed, it is referred to as an input power-split powertrain and the drive unit 12 when used therein is referred to as an input power-split drive unit. The powertrain 110 has four different operating modes and provides motive power to the axle A in three of the operating modes. In a first operating mode, referred to as an electric-only operating mode, the electric machine 14 is operated as a motor, the engine 64 is off, the first brake B1 is engaged and the first clutch C1 is disengaged to establish an electric operating mode in which only the electric machine 14 drives the output member 34. If the additional clutch C0 is provided, it is engaged.

In a second operating mode, referred to as an input power-split operating mode, both the first brake B1 and the first clutch C1 are disengaged, the engine 64 is on and drives the ring gear member 24, and the controller 52 controls the electric machine 14 to function as a motor or as a generator as required to provide with the engine 64 a desired speed at the output member 34. If the additional clutch C0 is provided, it is engaged. With both the first brake B1 and the first clutch C1 disengaged, the planetary gear set 20 is acting as differential gearing to combine the speeds of the rotor 16 and the crankshaft 66 to provide a speed at the output member 34.

In a third operating mode, referred to as a parallel hybrid operating mode or as a cruise gear, the first clutch C1 is engaged, the first brake B1 is disengaged, the engine 64 drives the ring gear member 24, and the electric machine 14 is controlled to function as a motor or as a generator as required to provide the engine 64 with a desired torque at the output member 34. If the additional clutch C0 is provided, it is engaged. With the first clutch C1 engaged, the planetary gear set 20 is at a direct drive ratio and both the rotor 16 and the crankshaft 66 rotate at the same speed to provide torque in parallel to the output member 34.

In a fourth operating mode, both the first brake B1 and first clutch C1 are engaged to hold the first planetary gear set 20 stationary in a park mode, also referred to as a locked mode. If the additional clutch C0 is provided, it is also engaged so that the axle A is held stationary.

If the starter motor 70 is provided, it can be used to start the engine 64 in a transition from the electric-only operating mode to the power-split operating mode, with the first brake B1 disengaged (i.e., released) as the starter motor 70 starts the engine 64. Alternatively, the engine 64 can be started in a transition from the electric-only operating mode to the power-split operating mode by disengaging the first brake B1 and slipping the first clutch C1. When the engine 64 starts, the clutch C1 may be disengaged to enter the input power-split operating mode or engaged to enter the parallel hybrid operating mode. If the additional clutch C0 is provided, it may be disengaged during engine starting to allow synchronizing and then engagement of the C1 clutch for engine starting instead of slipping.

To transition from the power-split operating mode to the parallel hybrid operating mode, the engagement of the first clutch C1 can be accomplished by the controller 52 controlling the speed of the rotor 16 to synchronize the speeds of the carrier member 26 and the ring gear member 24 and thereafter engage the first clutch C1 without slip while still providing the desired torque at the output member 34. Alternatively, if the first clutch C1 is configured to be able to slip in a controlled manner, the first clutch C1 can be controlled by the controller 52 to slip while engaging to bring the speed of the ring gear member 24 to the same speed as the carrier member 26. The transition can also be delayed in order to accomplish charging of the energy storage device 50 at higher engine speed and power generation available in the power-split mode.

In embodiments in which the energy storage device 50 is a battery, under certain operating conditions during the parallel hybrid operating mode (i.e., while the first clutch C1 is engaged and the first brake B1 is disengaged), the additional clutch C0 can be disengaged and the electric machine 14 can be controlled to function as a generator to recharge the energy storage device 50.

Figure 3:
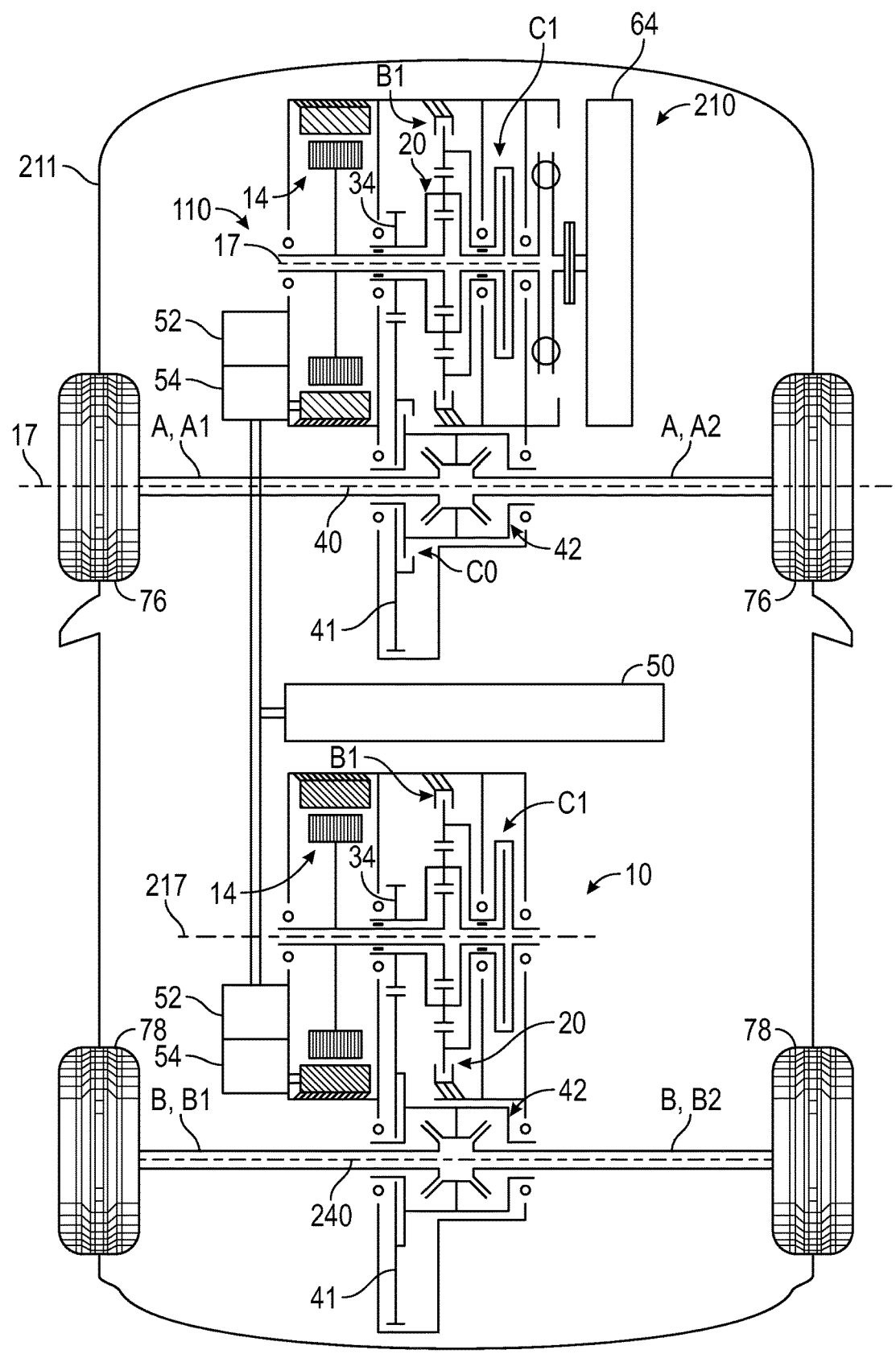
FIG. 3 is a schematic illustration of a third embodiment of a powertrain in accordance with another alternative aspect of the present teachings.

FIG. 3 shows an alternative embodiment of a powertrain 210 installed on an example vehicle 211. The powertrain 210 includes the powertrain 110 installed on a first axle A, shown as the front axle of the vehicle 211, and the powertrain 10 installed on a second axle B, shown as the rear axle of the vehicle 211. The second axle B includes two half shafts B1, B2. Accordingly, the powertrain 210 includes two identical electric machines 14 and one engine 64 available as power sources in an all-wheel drive arrangement (i.e., a two-axle drive arrangement). The drive unit 12 connected to the engine 64 for driving the first axle A is configured as a first module, and the drive unit 12 connected to the second axle B for driving the second axle B is configured as a second module identical to the first module. The electric machines 14 are operatively connected to a single energy storage device 50 and separate motor controller power inverter modules (each including a controller 52 and a power inverter 54) connected to each of the electric machines 14 or may be connected to a single controller. Front wheels 76 are mounted to rotate with the front axle A, and rear wheels 78 are mounted to rotate with the rear axle B. The second drive unit 12 is concentric about a third axis of rotation 217. The second axle B is concentric about a fourth axis of rotation 240 parallel with and spaced apart from the third axis of rotation 217. The differential 42 included in the powertrain 10 is referred to as a second differential and is configured to be driven by the output member 34 of the second drive unit 12 and drivingly connected to the first and second half shafts B1, B2 of the second axle B.

The powertrain 210 is operable to provide three different all-wheel drive operating modes. In a first hybrid all-wheel drive operating mode, the engine 64 is on, the first drive unit 12 at the first axle A operates in an input power-split operating mode as described with respect to FIG. 2 (i.e., with both the first brake B1 and the first clutch C1 disengaged) to drive the first axle A with the first electric machine 14 of the first drive unit 12 operating as a generator providing electric energy to the second drive unit 12 at the second axle B. The second drive unit 12 is controlled to operate in an electric-only operating mode in which the electric machine 14 of the second drive unit 12 is controlled to operate as a motor to drive the second axle B using electrical energy provided from the first drive unit 12. Such a configuration can be advantageous for producing an overall output torque level desirable for performance given that the input power-split drive unit may have a final drive ratio through the transfer gears 34, 41 that has a relatively low output torque in order to ensure efficient engine operation during highway cruising.

In a second all-wheel drive operating mode, the engine 64 is on, the first drive unit 12 at the first axle A operates in the parallel hybrid operating mode described with respect to FIG. 2 (with the first brake B1 disengaged and the first clutch C1 engaged) to drive the first axle A with the first electric machine 14 of the first drive unit 12 operating as a motor or as a generator, and the second drive unit 12 at the second axle B operating in an electric-only operating mode in either the low gear (i.e., at a reduction ratio of the output member 34 to the rotor 16) with the brake B1 engaged and the clutch C1 disengaged) or in direct drive (i.e., with the brake B1 disengaged and the clutch C1 engaged).

In a third all-wheel drive operating mode, the engine 64 is off and the electric machines 14 of both the first and second drive units 12 are controlled to function as motors, with the first brake B1 engaged and the first clutch C1 disengaged in both of the first drive unit 12 and the second drive unit 12.

As described with respect to FIG. 2, the powertrain 110 can be controlled to slip the clutch C1 to start the engine 64 in a transition from the electric-only operating mode to the input power-split operating mode. Additionally, the electric machine 14 of the first drive unit 12 can be controlled to function as a generator to recharge the energy storage device 50 as described with respect to FIG. 2.

Figure 4:
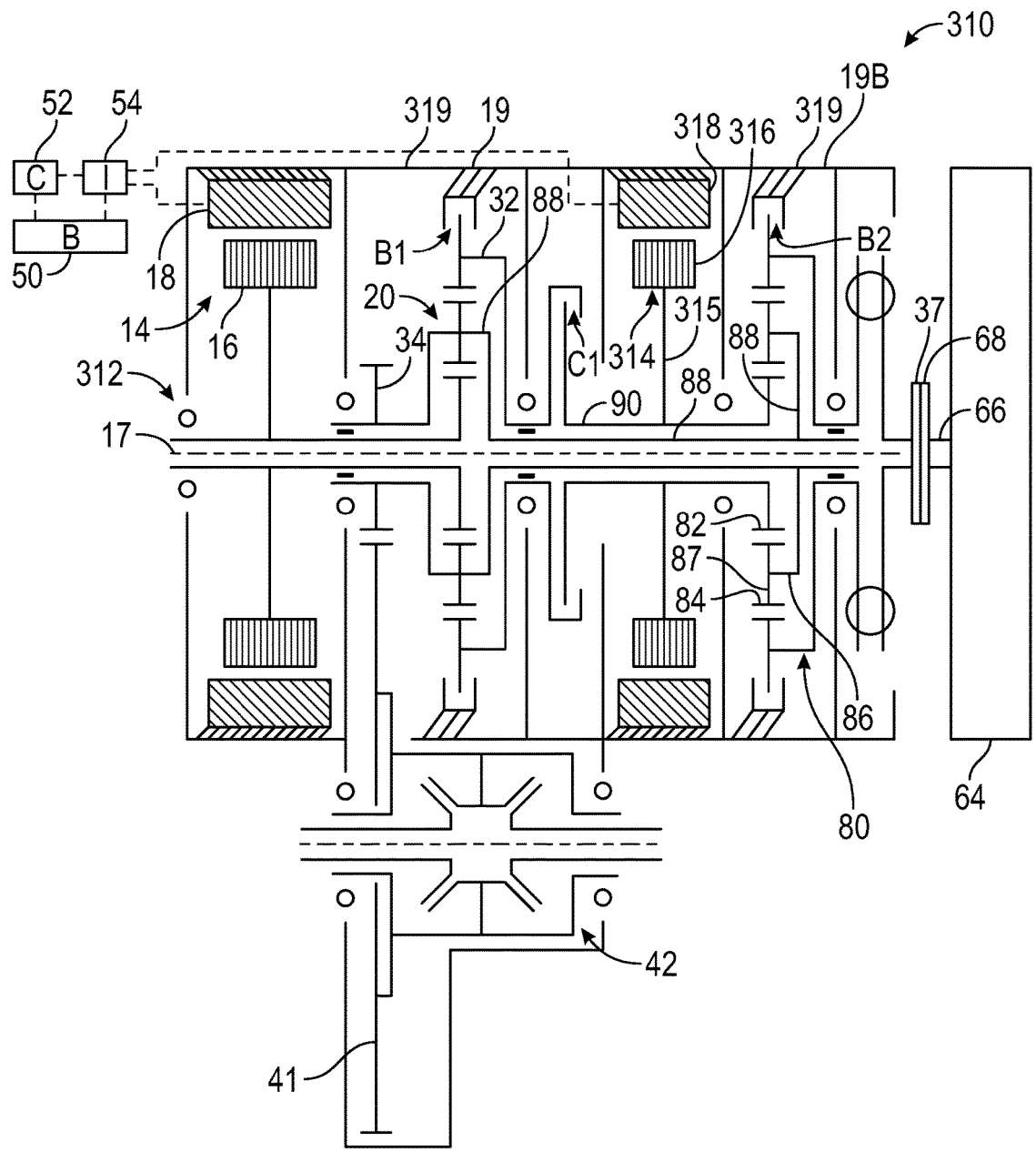
FIG. 4 is a schematic illustration of a fourth embodiment of a powertrain in accordance with the present teachings.

FIG. 4 shows another embodiment of a powertrain 310 that has a drive unit 312 that includes all of the components of the drive unit 12 as shown. The powertrain 310 is referred to as an input and compound power-split drive unit 312 and includes three power sources (i.e., two electric machines 14, 314, and an engine 64). The drive unit 312 includes the electric machine 14, the planetary gear set 20, the first brake B1 and the first clutch C1, and the output member 34 operatively connected to drive the first axle A via the differential 42. In addition, the drive unit 312 also includes a second planetary gear set 80 that is a simple planetary gear set having a sun gear member 82, a ring gear member 84, and a carrier member 86 that supports a plurality of pinion gears 87 that mesh with both the ring gear member 84 and the sun gear member 82. The sun gear member 82 of the second planetary gear set 80, the ring gear member 84 of the second planetary gear set 80, and the carrier member 86 of the second planetary gear set 80 are rotatable about the first axis of rotation 17.

The powertrain 310 includes a second electric machine 314 operable as a motor and having a rotor 316 connected to rotate in unison with the sun gear member 82 of the second planetary gear set 80 about the first axis of rotation 17. The second electric machine 314 also has a stator 318 grounded to a module housing 319 that includes the same components as the module housing 19 with an additional portion 19B of the housing 319 connected to radially surround the second electric machine 314 and the second planetary gear set 80.

An interconnecting member 88 continuously connects the carrier member 26 of the first planetary gear set 20 for rotation in unison with the carrier member 86 of the second planetary gear set 80. A second brake B2 is selectively engageable to ground the ring gear member 84 of the second planetary gear set 80 to the housing 319. The first clutch C1 is selectively engageable to connect the ring gear member 24 of the first planetary gear set 20 for rotation in unison with the sun gear member 82 of the second planetary gear set 80. More particularly, the first clutch C1 is engageable to connect the second hub portion 32 to rotate in unison with a sleeve shaft 90 that surrounds the interconnecting member 88. A rotor hub 315 supports the rotor 316 and is mounted to the sleeve shaft 90 to rotate in unison with the sleeve shaft 90. The sun gear member 82 is also mounted to the sleeve shaft 90 to rotate in unison with the sleeve shaft 90. The crankshaft 66 of the engine 64 is operatively connected to drive the ring gear member 84 of the second planetary gear set 80. The powertrain 310 requires only 10 bearings 58, 60, including minimally-sized bearings surrounding the shaft 29 of the rotor 16. Spin losses and cost are relatively low for this reason.

The powertrain 310 is operable in four different hybrid operating modes in which the engine 64 is on, and three different electric-only operating modes in which the engine 64 is off. A first hybrid operating mode is a first power-split operating mode, referred to as power-split Mode 1, in which the first brake B1 is engaged, the first clutch C1 and the second brake B2 are disengaged, the engine 64 is on, and each of the first and second electric machines 14, 314 are controlled to operate as a motor or as a generator. In power-split Mode 1, the effective torque ratio from the engine 64 to the output member 34 is affected by the torque ratios of both of the planetary gear sets 20, 80 due to the contribution of torque of the first electric machine 14 through the planetary gear set 20.

The powertrain 310 is operable in a second hybrid operating mode, referred to as a virtual gear, in which none of first brake B1, the second brake B2, and the first clutch C1 are engaged, the engine 64 is on, and the second electric machine 314 is controlled to hold the sun gear member 82 of the second planetary gear set 80 stationary. With the sun gear member 82 held stationary, torque flow can occur from the engine 64 through the second planetary gear set 80 to the output member 34 at a torque ratio established by the second planetary gear set 80.

The powertrain 310 is operable in a parallel hybrid operating mode (also referred to as a fixed gear hybrid operating mode) in which the first brake B1 and the first clutch C1 are engaged, the second brake B2 is disengaged, and the engine 64 is on to establish a torque ratio from the engine 64 to the output member 34 using both of the planetary gear sets 20, 80, and in which the engine 64 drives the second ring gear member 84 and the first electric machine 14 acts as a motor or as a generator.

The powertrain 310 is operable in a second power-split operating mode, referred to as power-split Mode 2, in which the first brake B1 and the second brake B2 are disengaged, the first clutch C1 is engaged, the engine 64 is on, and each of the first and second electric machines 14, 314 are controlled to act as a motor or as a generator.

The powertrain 310 is operable in three electric-only operating modes in which the engine 64 is off. For example, the powertrain 310 is operable in a one-motor electric-only operating mode in which the second brake B2 is engaged, the first brake B1 and the first clutch C1 are disengaged, and the second electric machine 314 functions as a motor to drive the output member 34 at a gear ratio established by the second planetary gear set 80. Because the first brake B1 and the first clutch C1 are disengaged, the first planetary gear set 20 is inactive, and the first electric machine 14 cannot be used to affect the speed ratio.

The powertrain 310 is operable in a first two-motor electric-only operating mode (M1) in which the first and the second brakes B1, B2 are engaged, the first clutch C1 is disengaged, and both of the first electric machine 14 and the second electric machine 314 function as motors to drive the output member 34 at a gear ratio established by both of the first and the second planetary gear sets 20, 80.

The powertrain 310 is operable in a second two-motor electric-only operating mode (M2) in which the first clutch C1 and the second brake B2 are engaged, the first brake B1 is disengaged, and both of the first electric machine 14 and the second electric machine 314 function as motors to drive the output member 34.

To transition between modes, the powertrain 310 can be controlled to transition through the virtual gear or the fixed gear. Propulsion and regeneration capabilities are maintained throughout the transition.

Accordingly, within the scope of the present teachings, a powertrain 10, 110, 210, or 310 includes at least one modular drive unit 12 having the first planetary gear set 20, with the sun gear member 22, the ring gear member 24, and the carrier member 26 all rotatable about the first axis of rotation 17, a first electric machine 14 operable as a motor and having a rotor 15 connected to rotate in unison with the sun gear member 22 about the first axis of rotation 17, a first brake B1 selectively engageable to ground the ring gear member 24, a first clutch C1 operatively connected to the ring gear member 24, and an output member 34 connected to rotate in unison with the carrier member 26 about the first axis of rotation 17. The drive unit 12 configured in this manner is adaptable to be each one of (i) an electric-only drive unit as shown in FIG. 1, an input power-split drive unit as shown in FIG. 2, and (iii) an input and compound power-split drive unit as shown in FIG. 4. Additionally, two drive units can be used in configuring an all-wheel drive powertrain, such as shown in FIG. 3, for example, a first modular drive unit 12 configured as the input power-split drive unit operatively connected to the first drive axle A, and a second modular drive unit 12 configured as an electric-only drive unit operatively connected to the second drive axle B.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle comprising:
   a powertrain including at least one modular drive unit having,
      a first planetary gear set, wherein the first planetary gear set is a simple planetary gear set having a sun gear member, a ring gear member, and a carrier member that supports a plurality of pinion gears that mesh with both the ring gear member and the sun gear member, wherein the sun gear member, the ring gear member, and the carrier member are rotatable about a first axis of rotation,
a first electric machine operable as a motor and having a rotor connected to rotate in unison with the sun gear member about the first axis of rotation, and the first electric machine is positioned axially farther from an axial end of the drive unit than is the first planetary gear set,
a first brake selectively engageable to ground the ring gear member,
a first clutch operatively connected to the ring gear member, and the first clutch is positioned axially closer to the axial end of the drive unit than both of the first planetary gear set and the first electric machine,
an output member connected to rotate in unison with the carrier member about the first axis of rotation;
wherein the drive unit is adaptable to be each one of,
an electric-only drive unit with the first clutch configured to connect the ring gear member to rotate in unison with either of the carrier member and the sun gear member,
an input power-split drive unit with the ring gear member operatively connected to an engine and the first clutch configured to connect the ring gear member to rotate in unison with either of the carrier member and the sun gear member, or
an input and compound power-split drive unit with, the carrier member connected to rotate in unison with a carrier member of a second planetary gear set concentric with the axis of rotation,
a ring gear member of the second planetary gear set operatively connected to the engine,
a second brake grounding the ring gear member of the second planetary gear set, and
the first clutch configured to connect the ring gear member of the first planetary gear set with a sun gear member of the second planetary gear set.

2. The vehicle of claim 1:
wherein the output member is positioned axially between the rotor and the first planetary gear set;
wherein the first planetary gear set is positioned axially between the output member and the first clutch;
further including a differential configured to be driven by the output member and rotatable about a second axis of rotation parallel with and spaced apart from the first axis of rotation;
wherein the first brake is selectively engageable to establish a reduction gear ratio through the first planetary gear set from the first electric machine to the output member; and
wherein the first clutch is selectively engageable to connect the ring gear member for rotation in unison with one of the carrier member and the sun gear member.

3. The vehicle of claim 2, wherein the first electric machine is the only power source operable to drive the output member when the drive unit is configured as the electric-only drive unit.

4. The vehicle of claim 3, wherein the first electric machine has a stator configured to drive the rotor, and further comprising:
an energy storage device operatively connected to the stator and operable to provide electric power to the stator; and wherein the energy storage device is one of a battery and a fuel cell.

5. The vehicle of claim 2, wherein both the first brake and the first clutch are selectively engageable to hold the first planetary gear set stationary in a park mode when the drive unit is configured as the electric-only drive unit or the input power-split drive unit.

6. The vehicle of claim 2, further comprising:
a first shaft rotatable about the first axis of rotation and driven by and supporting the rotor; wherein the sun gear member is mounted on and rotates with the first shaft;
a first hub concentric with the first shaft and extending axially from the carrier member to the output member;
a second hub concentric with the first hub and extending axially from and rotatable with the ring gear member;
wherein the axial end is a shaft portion of the second hub; and
wherein the first brake is disposed directly radially outward of the ring gear member.

7. The vehicle of claim 2, wherein:
the engine includes a crankshaft rotatable about the first axis of rotation and operatively connected to drive the ring gear member;
the drive unit is configured as the input power-split drive unit, in which,
the first brake is engaged and the first clutch is disengaged to establish an electric operating mode in which only the first electric machine drives the output member;
both the first brake and the first clutch are disengaged to establish an input power-split operating mode in which the engine drives the ring gear member and the first electric machine is controlled to act as a motor or a generator;
the first clutch is engaged and the first brake is disengaged in a parallel hybrid operating mode in which the engine drives the ring gear member and the first electric machine is controlled to act as a motor or a generator; and
both the first brake and the first clutch are engaged to hold the first planetary gear set stationary in a park mode.

8. The vehicle of claim 7, further comprising:
a starter motor operatively connected to the crankshaft; and
wherein the starter motor is controlled to start the engine in a transition from the electric-only operating mode to the input power-split operating mode.

9. The vehicle of claim 7, further comprising:
an additional clutch concentric about the second axis of rotation and selectively engageable to operatively connect the output member with the differential; and
wherein the first brake is disengaged, the first clutch is slipped, and the first electric machine is controlled to function as a motor to start the engine in a transition from the electric-only operating mode to the input power-split operating mode.

10. The vehicle of claim 2, further comprising:
an additional clutch concentric about the second axis of rotation and selectively engageable to operatively connect the output member with the differential;
an energy storage device operatively connected to the first electric machine; and
wherein the first brake and the additional clutch are disengaged, the first clutch is engaged, the engine is on, and the first electric machine is controlled to function as a generator to recharge the energy storage device when the drive unit is configured as the input power-split drive unit.

11. The vehicle of claim 2:
wherein the drive unit is further defined as a first drive unit configured as a first module;
wherein the differential is further defined as a first differential;
a second drive unit configured as a second module substantially identical to the first module and including a planetary gear set, an electric machine, a brake, a clutch, and an output member substantially identical to the first planetary gear set, the first electric machine, the first brake, the first clutch, and the output member of the first drive unit respectively, and concentric about a third axis of rotation parallel with and spaced from the first and second axes of rotation; and
a second differential configured to be driven by the output member of the second drive unit and rotatable about a fourth axis of rotation parallel with and spaced apart from the third axis of rotation.

12. The vehicle of claim 11, wherein:
the engine includes having a crankshaft rotatable about the first axis of rotation and operatively connected to drive the ring gear member of the first planetary gear set of the first drive unit; and
wherein the powertrain is operable to provide an all-wheel drive operating mode in which the engine is on, the first drive unit is configured as the input power-split drive unit which is operable in an input power-split operating mode with the first electric machine of the first drive unit providing electric energy to the second drive unit, and the second drive unit is configured as the electric-only drive unit which is operable in an electric-only operating mode in which the electric machine of the second drive unit drives the output member of the second drive unit using electrical energy provided from the first drive unit.

13. The vehicle of claim 12, further comprising:
an additional clutch concentric about the second axis of rotation and selectively engageable to operatively connect the output member of the first drive unit with the first differential; and
wherein the first brake of the first drive unit is disengaged, the first clutch is slipped, and the first electric machine of the first drive unit functions as a motor to start the engine in a transition from an electric-only operating mode of the first drive unit to the input power-split operating mode of the first drive unit.

14. The vehicle of claim 12, further comprising:
an additional clutch concentric about the second axis of rotation and selectively engageable to operatively connect the output member of the first drive unit with the first differential;
an energy storage device operatively connected to the first electric machine of the first drive unit; and
wherein the first brake and the additional clutch of the first drive unit are disengaged, the first clutch is engaged, the engine is on, and the first electric machine of the first drive unit is controlled to function as a generator to recharge the energy storage device.

15. The vehicle of claim 11, wherein the first electric machine of the first drive unit and the electric machine of the second drive unit are the only power sources operable to drive the output members of the first and the second drive units when the first and second drive units are each configured as the electric-only drive unit.

16. The vehicle of claim 2, further including a torsional vibration absorber connected to the axial end, and wherein the first clutch is positioned axially between the torsional vibration absorber and the first planetary gear set, and wherein the first electric machine is positioned axially farther from the torsional vibration absorber than is the first clutch.

17. The vehicle of claim 1, further comprising:
a first drive axle; and
a second drive axle parallel with and spaced apart from the first drive axle;
wherein the at least one modular drive unit is further defined as a first modular drive unit configured as the input power-split drive unit operatively connected to the first drive axle; and
wherein the at least one module drive unit further includes a second modular drive unit configured as the electric-only drive unit operatively connected to the second drive axle.

18. The vehicle of claim 1, wherein the second planetary gear set is a simple planetary gear set having the sun gear member, the ring gear member, and the carrier member that supports a plurality of pinion gears that mesh with both the ring gear member and the sun gear member; wherein the sun gear member of the second planetary gear set, the ring gear member of the second planetary gear set, and the carrier member of the second planetary gear set are rotatable about the first axis of rotation;
wherein the input and compound power-split drive unit further comprises,
a second electric machine operable as a motor and having a rotor connected to rotate in unison with the sun gear member of the second planetary gear set about the first axis of rotation,
an interconnecting member continuously connecting the carrier member of the first planetary gear set for rotation in unison with the carrier member of the second planetary gear set, and
the engine including a crankshaft operatively connected to drive the ring gear member of the second planetary gear set.

19. The vehicle of claim 18, wherein the input and compound power-split drive unit of the powertrain is operable in four hybrid operating modes including:
a first power-split operating mode in which the first brake is engaged, the first clutch and the second brake are disengaged, the engine is on, and each of the first and second electric machines are controlled to operate as a motor or as a generator;
a hybrid operating mode in which none of the first brake, the second brake, and the first clutch are engaged, the engine is on, and the second electric machine is controlled to hold the sun gear member of the second planetary gear set stationary;
a parallel hybrid operating mode in which the first brake and the first clutch are engaged, the second brake is disengaged, and the engine is on to establish a direct drive ratio from the engine to the output member in which the engine drives the second ring gear member and the first electric machine is controlled to act as a motor or as a generator; and
a second power-split operating mode in which the first brake and the second brake are disengaged, the first clutch is engaged, the engine is on, and each of the first and second electric machines are controlled to act as a motor or as a generator.

20. The vehicle of claim 18, wherein the input and compound power-split drive unit of the powertrain is operable in three electric-only operating modes in which the engine is off, including:
- a one-motor electric-only operating mode in which the second brake is engaged, the first brake and the first clutch are disengaged, and the second electric machine functions as a motor to drive the output member at a gear ratio established by the second planetary gear set;
- a first two-motor electric-only operating mode in which the first and the second brakes are engaged, the first clutch is disengaged, and both of the first electric machine and the second electric machine function as motors to drive the output member at a gear ratio established by both of the first and the second planetary gear sets; and
- a second two-motor electric-only operating mode in which the first clutch and the second brake are engaged, the first brake is disengaged, and both of the first electric machine and the second electric machine function as motors to drive the output member.

\* \* \* \* \*